United States Patent [19]
Fleagle

[11] 3,988,599
[45] Oct. 26, 1976

[54] SIGNAL PROCESSING CIRCUIT SUITABLE FOR WHEEL SLIP CONTROL SYSTEM FOR AUTOMOTIVE VEHICLES AND THE LIKE

[75] Inventor: Joseph E. Fleagle, Overland, Mo.

[73] Assignee: Wagner Electric Corporation, Parsippany, N.J.

[22] Filed: Aug. 25, 1975

[21] Appl. No.: 607,701

Related U.S. Application Data

[62] Division of Ser. No. 546,270, Feb. 3, 1975.

[52] U.S. Cl. ............................. 307/265; 307/233 B; 303/21 CG; 307/215; 307/235 T
[51] Int. Cl.² ........................................... H03K 1/18
[58] Field of Search ........ 307/233 R, 233 A, 233 B, 307/265, 266, 235 T, 215; 303/21 CG, 21 PV, 21 I

[56] References Cited
UNITED STATES PATENTS

| | | | |
|---|---|---|---|
| 3,674,318 | 7/1972 | Hickner et al. | 303/21 CG |
| 3,800,167 | 3/1974 | Smith | 307/265 |
| 3,839,650 | 10/1974 | Wood | 307/233 A |
| 3,867,647 | 2/1975 | Callahan | 307/233 A |
| 3,912,340 | 10/1975 | Bertolasi | 303/21 BE |

*Primary Examiner*—John S. Heyman
*Attorney, Agent, or Firm*—Eyre, Mann, Lucas & Just

[57] ABSTRACT

A signal processing circuit provides control signals suitable for controlling the application of braking pressure in a fluid-control brake actuating mechanism. An input signal whose amplitude is proportional to wheel speed is differentiated to yield a signal proportional to acceleration and deceleration. A first output signal is generated when a predetermined deceleration threshold is exceeded. A second output signal is generated when both a deceleration and a velocity threshold are simultaneously exceeded. The second output signal is maintained until the velocity signal exceeds a variable reference threshold which varies with acceleration alone during acceleration.

16 Claims, 6 Drawing Figures

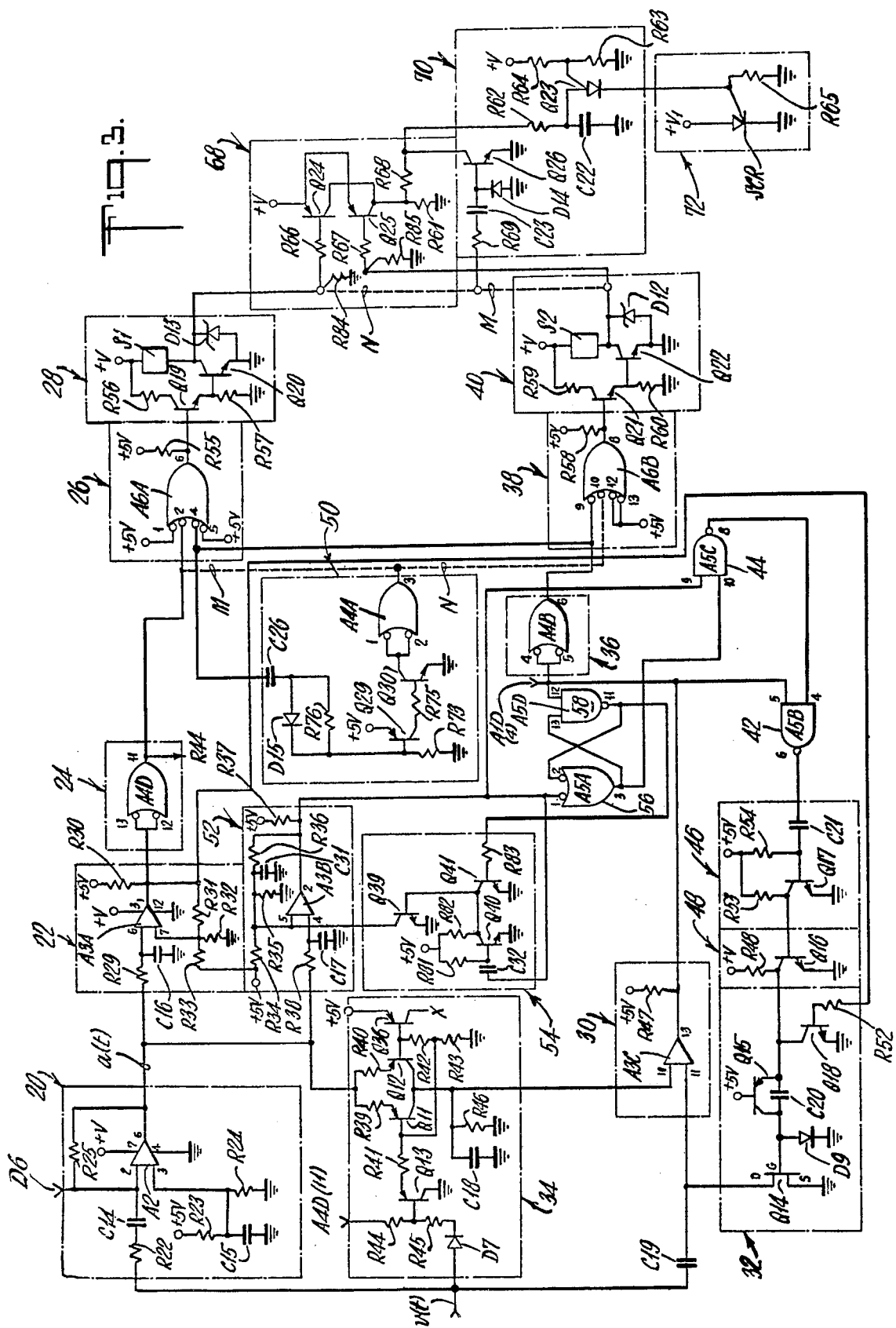

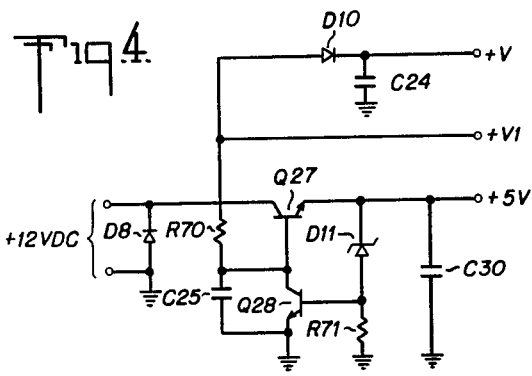
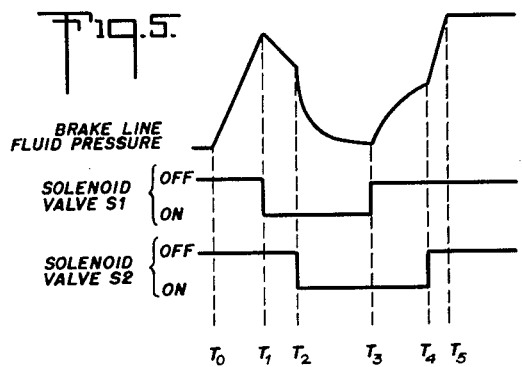
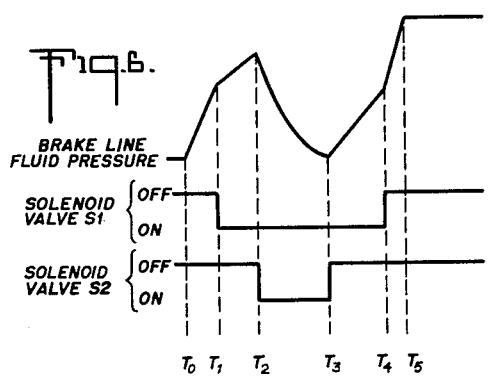

SIGNAL PROCESSING CIRCUIT SUITABLE FOR WHEEL SLIP CONTROL SYSTEM FOR AUTOMOTIVE VEHICLES AND THE LIKE

CROSS-REFERENCE TO RELATED APPLICATIONS

This is a division of application Ser. No. 546,270, filed Feb. 3, 1975.

The system, circuit and method disclosed herein incorporate several major technological advances over the system, circuit and method disclosed in application Ser. No. 218,378 entitled WHEEL SLIP CONTROL SYSTEM FOR AUTOMOTIVE VEHICLES AND THE LIKE filed on Jan. 17, 1972 in the name of Joseph E. Fleagle, which matured into U.S. Pat. No. 3,827,760 issued on Aug. 6, 1974. This application is a divisional application of co-pending U.S. patent application Ser. No. 546,270, filed Feb. 3, 1975. The present system may advantageously incorporate one or more vehicle wheel speed sensors of the type disclosed and claimed in application Ser. No. 363,604 entitled VEHICLE WHEEL SPEED SENSOR filed on May 24, 1973 in the names of Donald R. Stigall and Richard C. Bueler. The present system may also advantageously incorporate the modulator valve assemblies disclosed and claimed in application Ser. No. 218,293 entitled BRAKE ANTI-LOCK MECHANISM filed on Jan. 17, 1972 in the name of John A. Machek, which matured into U.S. Pat. No. 3,759,167 issued on Sept. 11, 1973; in application Ser. No. 362,018 entitled BRAKE ANTI-LOCK MECHANISM filed on May 21, 1973 in the name of John A. Machek; and in application Ser. No. 369,966 entitled ANTI-LOCK BRAKE SYSTEM AND CONTROL VALVE THEREFOR filed on June 14, 1973 in the name of John A. Machek. The disclosures of each and every one of the related applications set forth above and of any patents which have issued or may issue thereon are hereby incorporated by reference into the present application. The related applications set forth above have all been assigned to Wagner Electric Corporation, the assignee of the present application.

BACKGROUND OF THE INVENTION

The present invention is directed toward generating control signals for use in the control of wheel slip for vehicles. Cross-referenced U.S. Pat. No. 3,827,760 issued on Aug. 6, 1974 in the name of the present applicant, discloses a signal processing circuit for a wheel slip control system in which an output control signal is generated when the deceleration exceeds a variable reference increment of wheel speed. The variable reference increment of wheel speed was directly related to the rate of change of wheel speed.

SUMMARY OF THE INVENTION

The present invention teaches a novel utilization of input signals proportional to velocity and the derived rate of change of velocity to determine when output signals are generated. A first output signal is generated whenever the derived deceleration exceeds a predetermined deceleration threshold. A second output signal is generated when the decrease in the amplitude of the input velocity signal from the time the predetermined deceleration threshold has been exceeded exceeds a predetermined variable reference increment $\Delta v$. The variable reference increment $\Delta v$ is determined by (1) the value of velocity at the time said deceleration threshold is exceeded and (2) a reference signal which is continuously variable and in direct relation to (a) both velocity and deceleration during deceleration and (b) only to acceleration during periods of acceleration.

BRIEF DESCRIPTION OF THE DRAWINGS

The present invention may be better understood by reading the written description thereof with reference to the accompanying drawings of one embodiment of the signal processing circuit, of which:

FIGS. 2 and 3 combined form a schematic wiring diagram of the signal processing circuitry illustrated generally in FIG. 1; and FIG. 4 is a schematic wiring diagram of a power supply circuit for the signal generating and processing circuitry of FIGS. 2–3; and FIGS. 5 and 6 comprise a series of graphs representative of values of various significant parameters of the present system, all of said graphs in each figure having a common time base.

DETAILED DESCRIPTION OF THE PREFERRED EMBODIMENT

Figure 1:
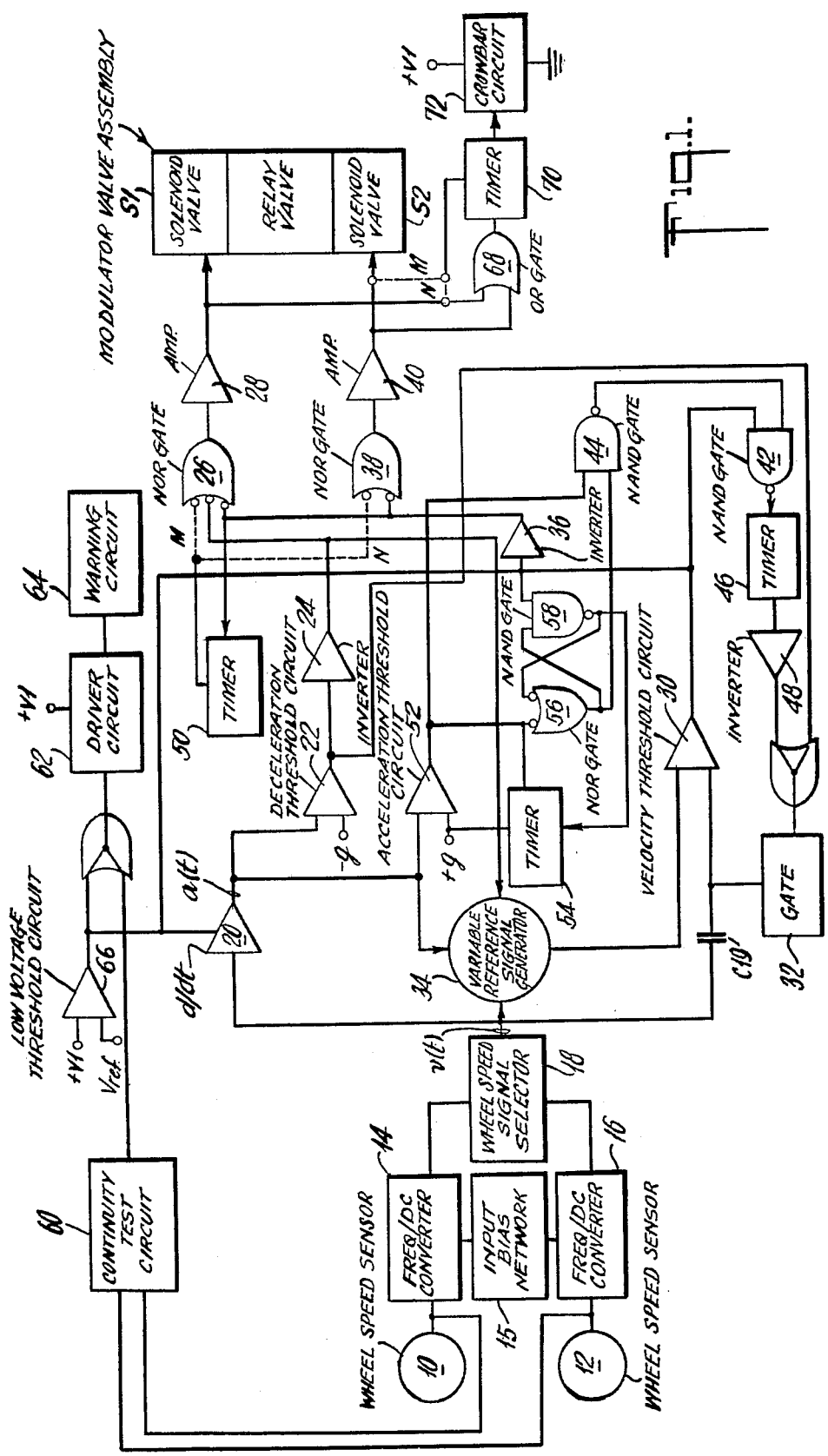
FIG. 1 is a logic block diagram of the preferred embodiment of the signal processing circuit which processes velocity signals and generates control outputs.

Referring specifically to the logic diagram shown in FIG. 1, the first and second wheel speed analog signals are fed into wheel speed selector circuit 18, which preferably operates to pass only the signal representative of the lowest wheel speed. Although different criteria may be applied, e.g., select-high or average, the select-low approach has been found to afford optimum results, particularly in terms of vehicle stability. Thus, a signal $v(t)$ which is proportional to the speed of the slowest-rotating wheel is provided at the output of wheel speed signal selector 18. This signal is fed to differentiating circuit 20, which in turn generates a signal $a(t)$ proportional to the rate of change of the wheel speed signal $v(t)$. The rate-of-change signal $a(t)$ forms the variable input to deceleration threshold circuit 22, which compares $a(t)$ to a deceleration reference signal $-g$ which represents a predetermined value of wheel deceleration, preferably $-1.25g$. When the rate-of-change signal $a(t)$ exceeds the reference signal $-g$, a variable-width, positive-going pulse of constant amplitude is generated by threshold circuit 22. This deceleration pulse is fed to inverter 24, which responds by applying a negative-going pulse to an input channel of NOR gate 26. A positive output pulse is consequently generated by NOR gate 26 and amplified by power amplifier 28 to energize solenoid valve S1, thereby effecting relief of brake line fluid pressure in the brake system of the associated vehicle.

Meanwhile, the wheel speed analog signal $v(t)$ is continuously fed through capacitance C19 to velocity threshold circuit 30, which is inoperative to perform any comparison function while its velocity signal input is shunted by gate circuit 32. The negative-going output pulse of inverter 24 constitutes an input to gate 32, which responds thereto by allowing $v(t)$ to pass to the velocity signal input of threshold circuit 30 for monitoring the decrease in $v(t)$ from the initial value $V_1$ of $v(t)$ at the time the gating circuit 32 is actuated. Thus, the initial value $V_1$ is representative of the speed of the selected wheel at the time the deceleration threshold $-g$ of circuit 22 was reached. As $v(t)$ decreases due to the application of reduced braking force, velocity threshold circuit 30 compares the wheel speed analog signal $v(t)$ to a variable reference increment of wheel velocity $\Delta v$. This reference increment $\Delta v$ is determined by the difference between the initial value $V_1$ which is fixed in any given cycle but varies from cycle to cycle, and the instantaneous value of the output of variable reference signal generator 34. During the wheel deceleration portion of each cycle of system operation, the variable reference signal produced by generator 34 is a function of both instantaneous wheel speed and deceleration. This permits better stopping distances, because the wheels are forced to slip further at high speeds before sharp relief of brake fluid line pressure is effected by energization of solenoid valve S2. During the wheel re-acceleration (spin-up) portion of each cycle, the output of generator 34 is a function of acceleration only; the relationship is preferably linear, but can be made non-linear to cause earlier reapplication of braking force in situations where wheel acceleration exceeds a predetermined value, e.g., about +5g, indicating that braking force is far below its optimum value.

If $v(t)$ falls below its initial value $V_1$ by more than the variable reference increment $\Delta v$, velocity threshold circuit 30 generates a variable-width, positive-going pulse of constant amplitude. This slip pulse is applied to the input of inverter 36, which in turn applies a negative-going pulse to an input of NOR gate 38 and to an input of NOR gate 26. A positive output pulse is consequently generated by NOR gate 38 and amplified by power amplifier 40 to energize solenoid valve S2, thereby effecting sharp relief of brake line fluid pressure, and the positive output pulse generated by NOR gate 26 in response to the inverted deceleration pulse from threshold circuit 22 is continued to maintain solenoid valve S1 energized. The positive slip pulse from velocity threshold circuit 30 is also applied to NAND gate 42, which normally receives a positive signal from NAND gate 44 at its other input. Consequently, a negative pulse is produced at the normally-high output of NAND gate 42 and timer 46 is actuated thereby to provide a positive input to inverter 48, which in turn applies a negative input pulse to gate 32 for a predetermined period of time, preferably about 1.6 seconds maximum. Thus, gate 32 can allow the passage of $v(t)$ to velocity threshold circuit 30 even after the deceleration pulse from deceleration threshold circuit 22 is terminated. The negative-going pulse generated by inverter 36 is also fed as a priming input to timer 50, the output of which is connected (N) to an input of NOR gate 38 for a system including a modulator valve assembly of normal construction, or is connected (M) to an input of NOR gate 26 for a system having a modulator valve assembly of modified construction. In the aforementioned normal valve, solenoid valve S1 has a service inlet and a service exhaust, and solenoid valve S2 has a service exhaust only. With this normal type of modulator valve assembly, the system is capable of the following modes of operation:
1. S1, S2 both de-energized: normal service position, rapid application rate of brake line fluid pressure to control chamber of modulator valve assembly.
2. S1 energized, S2 de-energized: slow exhaust rate from control chamber of modulator valve assembly.
3. S1, S2 both energized: rapid exhaust rate from control chamber of modulator valve assembly.
4. S1 de-energized, S2 energized: reduced application rate of brake line fluid pressure.

These modes of operation of the system having this normal modulator valve assembly is shown in FIG. 5. With the modified modulator valve assembly, the system is capable of the following modes of operation:
1. S1, S2 both de-energized: normal service position, rapid application rate of brake line fluid pressure to control chamber of modulator valve assembly.
2. S1 energized, S2 de-energized: reduced application rate of brake line fluid pressure.
3. S1, S2 both energized: rapid exhaust rate of brake line fluid pressure from control chamber of modulator valve assembly.

These modes of operation of the system having this modified modulator valve assembly is shown in FIG. 6. However, the system employing a normal modulator valve assembly is preferable in order to limit the rise rate of brake line fluid pressure and the peak value thereof when operating a vehicle on surfaces having a low coefficient of friction $\mu$ (mu). This slower application and peak-limiting of the brake line fluid pressure is achieved by creating a deliberate leak in the modulator valve assembly. With S1 de-energized and S2 energized, some of the incoming (service) air passing unvented through solenoid valve S1 is bled off by S2. Both the rate at which brake line fluid pressure rises and the balance-off pressure are determined by the ratio of the service air inlet orifice and the outlet orifice of solenoid valve S2.

With both solenoid valves S1 and S2 energized, brake line fluid pressure is decreasing and will allow the wheel to re-accelerate. When the rate-of-change signal $a(t)$ of the monitored wheel received by acceleration threshold circuit 52 exceeds the acceleration reference signal $+g$ representing a predetermined value of wheel acceleration, preferably +2.5gs, a variable-width, negative-going pulse of constant amplitude is generated by acceleration threshold circuit 52. This acceleration pulse is fed as an actuating input to timer 54, which provides a positive feedback signal of approximately 180 milliseconds duration to insure that the acceleration pulse has this minimum duration. This feature prevents spurious outputs from the wheel speed sensors 10 and 12 (due to wheel vibration during braking) from causing rapid alternating or chattering of the output of acceleration threshold circuit 52, which undesirably interrupts the skid control sycle. The acceleration pulse also sets the flip-flop circuit formed by NOR gate 56 and NAND gate 58, causing the output of gate 56 to go high, the coincidence of which with the slip pulse causes the output of NAND gate 58 to go low, thereby latching the output of NOR gate 56. Due to the inherent time delay between the application of the negative acceleration pulse at one input of NOR gate 56 and the appearance of its high or positive output, the negative acceleration pulse will be received by NAND gate 44 just prior to the positive output of NOR gate 56. Thus, the output of NAND gate 44 will remain at its normal high, thereby continuing to supply a high input to NAND gate 42. Consequently, timer 46 remains actuated until (1) the slip pulse terminates or (2) the acceleration pulse terminates or (3) the timer has run for its predetermined period of time, preferably about 1.6 seconds. The occurrence of any one of these events will remove the gating signal from gate 32 and thereby halt the comparison function carried out by velocity threshold circuit 30.

Since the slip pulse constitutes a positive or high input to NAND gate 58, along with the positive output of NOR gate 56 produced in response to the negative acceleration pulse, the termination of the slip pulse will cause the output of NAND gate 58 to return to its normal high, thereby resetting timer 54 and removing a low input from NOR gate 56. If the acceleration pulse has not yet terminated, the output of NOR gate 56 will remain high, thus maintaining opposite inputs to NAND gate 44 which in turn maintains its high output. However, with the termination of the slip pulse, the other necessary input is removed from NAND gate 42, thereby causing its output to go high and reset timer 46, the output of which goes low when the output of NAND gate 42 goes high. Thus, inverter 48 applies a positive input to gate 32, causing it to shunt $v(t)$ from velocity threshold circuit 30. The same result is obtained if the acceleration pulse terminates prior to the slip pulse. With increasing wheel velocity and decreasing wheel acceleration, the acceleration pulse will be terminated. However, acceleration threshold circuit 52 is designed with hysteresis, so that it will initiate generation of an acceleration pulse when the acceleration of the monitored wheel exceeds +2.5 gs, but will terminate the acceleration pulse when acceleration of the monitored wheel falls below +0.5 g. Upon termination of the negative-going acceleration pulse, the input of timer 54 is removed and one input of NOR gate 56 goes high. However, the other input is held low by the ouput of NAND gate 58. Thus, the output of NOR gate 56 remains high after termination of the negative acceleration pulse. Thus, NAND gate 44 has two high inputs, causing its output to go low. A high input is thus removed from NAND gate 42, causing its output to go low and thereby reset timer 46 and remove the gating signal from gate 32. Thus, termination of the acceleration pulse causes termination of the slip pulse, thereby removing the other input from NAND gate 42.

The termination of the slip pulse also causes timer 50 to initiate generation of a negative output pulse, the duration of which is nonlinearly dependent upon the duration of the slip pulse. Thus, solenoid valve S2 is maintained in an energized condition for a short, variable period of time after termination of the slip pulse in a system having a normal modulator valve assembly as described earlier. In a system having a modified modulator valve assembly, also described earlier, it is solenoid valve S1 which has its period of energization extended by the negative output pulse from timer 50. After timer 50 runs out, both solenoid valves S1 and S2 are de-energized and the full cycle is completed. As the system repetitively re-cycles, decreasing initial values $V_2, V_3, \ldots V_n$ of the decreasing wheel speed analog signal $v(t)$ are employed in combination with the continuously-variable output of reference signal generator 34 to define the variable reference increment of wheel speed $\Delta v$ within each cycle. Each cycle may include the generation of only a deceleration pulse, or the generation of both deceleration and slip pulses, or the generation of deceleration, slip, and acceleration pulses, depending upon a number of factors including vehicle characteristics, load size and distribution, and conditions at the tire-road interface.

Several peripheral circuits are preferably included in the present system. Continuity test circuit 60 responds to a discontinuity in either of the wheel speed sensors 10 or 12 by providing a signal to driver circuit 62, which in turn responds by energizing warning circuit 64. Low voltage threshold circuit 66 is operative to disable differentiator circuit 20 from generating an acceleration pulse if +V1 (provided by the power supply circuit of FIG. 4) falls below Vref. If +V1 falls below Vref after an acceleration pulse has been generated, low voltage threshold circuit 66 is operative to load the output of velocity threshold circuit 30 so that any slip pulse generated thereby will have no effect on the balance of the circuitry. A fail-safe circuit comprising OR gate 68, timer 70, and crowbar circuit 72 is connected to the solenoid valves S1 or S2. Generally, if either S1 or S2 is energized for more than 2–3 seconds, power is removed from the circuitry. However, it is possible under certain operation conditions for S2 to be continually energized in a system having a normal modulator valve assembly, while S1 cycles on and off. The resetting inputs received by timer 70 from S1 under these circumstances will prevent the timer 70 from causing crowbar circuit 72 to remove power.

Figure 2:
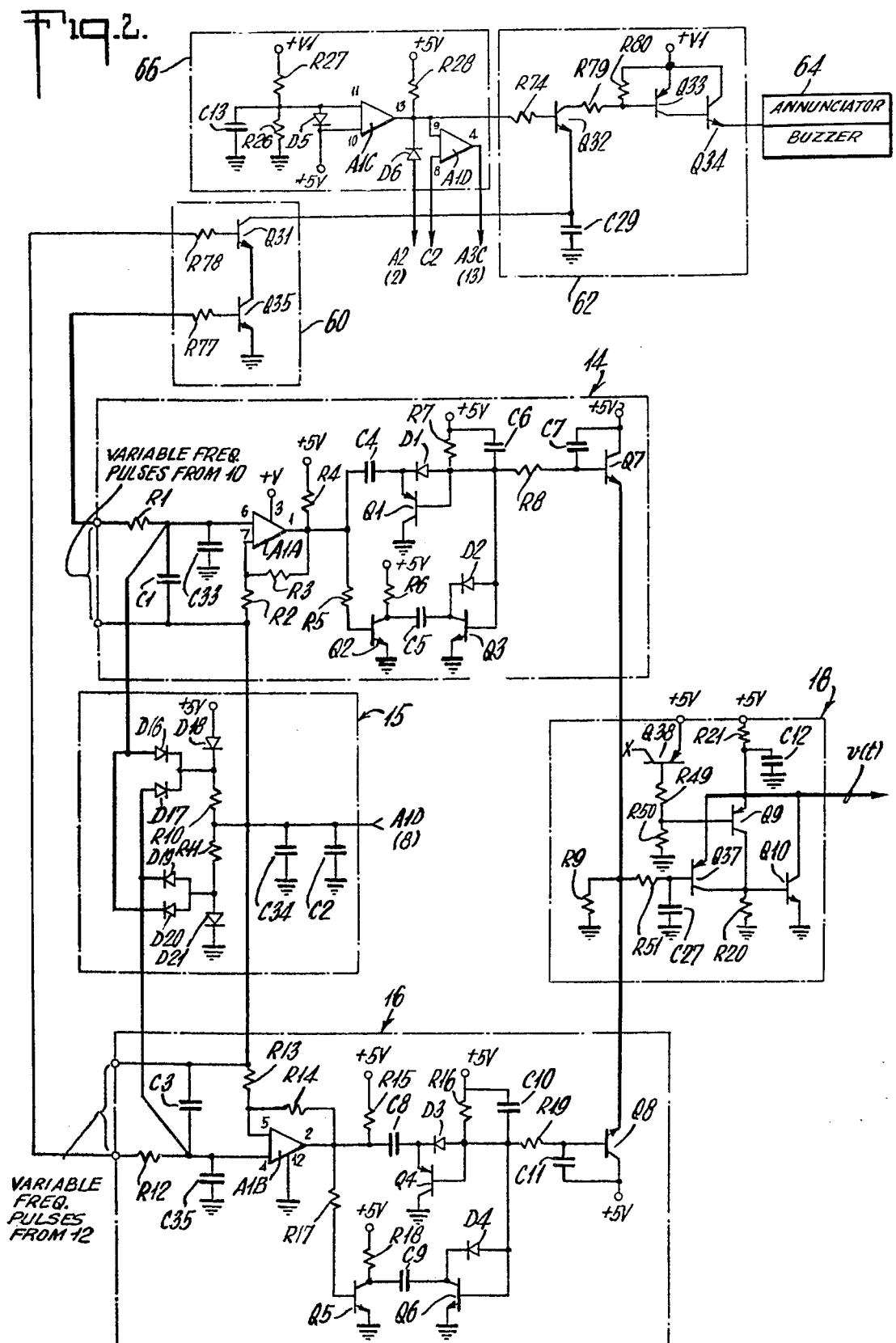

Referring now to the schematic wiring diagram formed by FIGS. 2 and 3, the frequency/DC converters 14 and 16 are identical. Therefore, only the left wheel converter will be discussed. The variable frequency pulses from wheel speed sensor 10 are received at the input terminals of frequency/DC converter 14 as indicated, and are fed through a low pass filter formed by R1 and C1 to comparator A1A, which is a Schmitt trigger circuit. The voltage divider R10 and R11 in the input bias network 15 raises the wheel speed sensor ground to 2.5 volts (DC). Although a floating input is not necessary for system operation, it is necessary for the proper operation of the continuity test circuit. The voltage divider formed by R2 and R3 provides a hysteresis signal to the input of comparator A1A to give that circuit a definitely switched or not-switched characteristic for the square wave output, which has a 50 percent duty cycle. The frequency of the symmetrical square wave output pulses from comparator A1A is the same as the frequency of the pulses received from wheel speed sensor 10. A current path is provided by R4 to drive the tachometer portion of the frequency/DC converter 14. The tachometer section consists of transistor Q1, diode D1, capacitances C4 and C6, and resistances R4 and R7, and is operative to convert signals of varying frequency into corresponding DC level voltages which are proportional to the frequency of the pulses received by the tachometer circuit from the comparator A1A.

With comparator A1A normally switched low, the emitter of Q1 is at +5 volts (DC). When the output of comparator A1A switches to +5 volts, Q1 is switched on, since it now has 5 volts at its base and over 5 volts at its emitter. Thus, C4 is clamped to the voltage of C6, which is the output voltage of the tachometer circuit, less a 0.6 volt drop across D1. Comparator A1A switches to a low state again, and C4 draws charge from C6, thus dropping the tachometer output voltage to a level determined by the ratio of the values of C4 and C6. Transistor Q2 inverts the output pulses of comparator A1A and applies the inverted pulse train through C5 to the emitter of transistor Q3. Thus, a pulse train of twice the frequency of the output of comparator A1A appears at C6. The high-frequency components of the tachometer circuit is filtered by a low-pass filter formed by R8 and C7. The low-frequency components of the tachometer circuit output are buffered by transistor Q7. In the present embodiment, the tachometer circuit provides a drop of 50 millivolts per mile per hour increase in wheel velocity.

The wheel speed signal selector is designed to provide additional filtering for the selected wheel speed signal and provides a low output impedance suitable for driving the sub-circuits to which the $v(t)$ signal is fed. The selection function is performed by transistors Q7 and Q8. If the left wheel speed signal voltage is higher (thus indicating a lower wheel velocity), then Q7 is conductive and Q8 is turned off, and vice versa under opposite conditions. The wheel speed signal selector may be modified to perform the select-average function by connecting the bases of Q7 and Q8 together. Transistor Q10 and resistances R20 and R21 form a low impedance driver circuit. The output of this circuit is the analog of the speed of the selected wheel, and has been designated as $v(t)$. Resistances R9, R51, R21, and capacitances C12 and C27, provide additional filtering of the high frequency components of the wheel speed signals. A low-speed lock-out circuit is formed by transistors Q38 and Q9 and resistances R49 and R50. When wheel speeds are 3 miles per hour or slower, Q9 provides a fixed equivalent reference voltage of 3 miles per hour to the wheel speed signal selector circuit 18, which will see only this fixed equivalent reference voltage whenever actual wheel velocity drops below 3 miles per hour. When a wheel comes out of lock-up, this feature prevents differentiator 20 from interpreting the rapid change of $v(t)$ from 0 to some finite value as an infinite acceleration. Q38 provides compensation for temperature variations in base-emitter junction voltage drop in Q9.

Differentiator 20 provides an output $a(t)$ proportional to the rate of change of $v(t)$. Resistances R23 and R24 determine the no-signal output from comparator A2, and these resistances are chosen so that the output of comparator A2 is 4.5 volts (DC) under the no-acceleration condition. The acceleration signal $a(t)$ varies by +100 millivolts/g during acceleration and by −100 millivolts/g during deceleration of the monitored wheel. Resistances R22 and R25 and capacitance C14 have been chosen so that a rate of change of input voltage of about 1.10 volts (DC)/second, corresponding to 1g, will change the acceleration signal $a(t)$ by 100 millivolts. The deceleration threshold circuit 22 receives $a(t)$ for comparison by A3A to the −g reference voltage corresponding to −1.25g deceleration as set by the voltage divider formed by resistances R32 and R33. Resistances R31 and R32 provide a hysteresis signal to allow A3A to switch between high and low states with a clean characteristic. Upon application of the brakes, a wheel deceleration of −1.25g or greater will cause energization of solenoid valve S1 through inverter 24 (A4D) and NOR gate 26. The deceleration pulse from A3A unclamps pin 11 of A3C by turning Q18 on thereby shunting the emitter of Q15 to ground. Q15 cuts off. Capacitor C20 is initially charged to approximately 5 volts, its left end being clamped to approximately zero volts by forward conduction of diode D9. When Q18 turns on it clamps one side of C20 to ground. The other side of C20 becomes approximately 5 volts negative. The negative 5 volts from C20 biases Q14 to cutoff thereby unclamping one end of C19. The end of C19 which is connected to pin 11 of A3C is thus zero volts immediately upon unclamping. The voltage subsequently fed to pin 11 of A3C is zero plus or minus changes in $v(t)$ referenced to the value of $v(t)$ at the instant of unclamping. When the change in $v(t)$ is greater than the variable reference signal at pin 10 of A3C, a slip pulse is generated at pin 13, thereby energizing solenoid valves S1 and S2 through inverter 36 (A4B) and NOR gates 26 and 38, respectively.

Acceleration threshold circuit 52 includes a resistance R38 and a capacitance C17 connected to pin 4 of A3B to introduce a deliberate sluggishness or hysteresis into this circuit. When the $a(t)$ signal exceeds the first or higher threshold determined by resistances R34 and R35 connected at their junction to pin 5 of A3B, the output at pin 2 of A3B goes low. In the present embodiment, this first or higher threshold is preferably +2.5g. Depending upon the values of R38 and C17, the output of A3B will remain low until the $a(t)$ signal falls below a second, lower threshold value, which in the present embodiment is preferably +0.5g.

Timer 54 is preferably included in the signal processing circuit for the purpose of preventing spurious termination of the acceleration pulse development at pin 2 of A3B in acceleration threshold circuit 52. This can result when a locked wheel acts as a torsional pendulum, i.e., oscillates about its axis of rotation. Timer 54 makes acceleration threshold circuit 52 wait for monotonic wheel acceleration through the action of Q39 and Q40, which respond to the negative acceleration pulse applied through capacitance C32 to the base of Q40 to cause Q40 to become non-conductive, its turn-on current being momentarily shunted by capacitance C32 and the low output at pin 2 of A3B in acceleration threshold circuit 52. Thus, the collector of Q40 goes high, thereby turning on Q39 to ground pin 5 of A3B in acceleration threshold circuit 52. This condition will continue until either the acceleration pulse terminates or C32 charges to a point on which Q40 is again turned on, whereupon Q39 will be turned off to disconnect pin 5 of A3B from ground. The latter event will occur after about 180 milliseconds in the present embodiment. Transistor Q41 responds to the slip pulse inverted by AND gate 58 (A5D) to cancel this action of timer 54 when the slip pulse terminates before C32 charges to a level at which Q40 is rendered conductive.

The variable reference signal generator 34 receives and processes the signals $v(t)$ and $a(t)$. Transistor Q12 is a current source which is modulated by the $a(t)$ signal. The current output of Q12 decreases with decreasing $a(t)$ applied to the emitter, thereby causing voltage to decrease across R46, thereby lowering the variable reference signal. The components of this circuit have been chosen so that the wheel velocity at which the slip pulse is generated increases at the rate of 1 mile per hour per g of deceleration. An additional current is generated by transistor Q11, which is biased by voltage divider R42, R43 and the $v(t)$ signal through diode D7, resistances R44 and R45 and transistor Q13 during decelerations. The lower $v(t)$ voltage (indicating higher wheel speed), the higher the variable reference signal, and therefore the higher the wheel speed change at which the slip pulse is generated. However, upon termination of the acceleration pulse at pin 11 of A4D, the bias on transistor Q13 no longer varies, but rather is fixed by the voltage divider formed by resistances R42 and R43. Therefore, the threshold signal applied to pin 10 of A3C is a function of $a(t)$ only under these circumstances.

As braking force is relieved, the acceleration pulse is terminated, but solenoids S1 and S2 are maintained energized by the slip pulse appearing at pin 13 of velocity threshold circuit 30 (A3C). As wheel speed is allowed to increase, an acceleration pulse is developed at pin 2 of acceleration threshold circuit 52 (A3B) when acceleration exceeds +2.5g as determined by the voltage divider formed by resistances R34 and R35. The acceleration pulse resets the output of NAND gate 42 (A5B) which actuated timer 46, but at the same time the acceleration pulse also resets the output of NAND gate 44 (A5C) from high to low, thereby keeping the timer continually on. As wheel velocity approaches vehicle velocity, the acceleration decreases, thereby terminating the acceleration pulse at +0.5g and clamping the input of velocity threshold circuit 30 (A3C), thereby causing the slip pulse to disappear. If wheel speed should increase so slowly that no acceleration pulse is generated, for example when the associated vehicle is operating on a slippery surface, the timer 46 will terminate the slip pulse by removing the gating signal from gate 32 through inverter 48 after a predetermined period of time determined by the charging period of C21 through R54 and the low output of pin 6 of NAND gate 42 (A5B).

Regardless of how the slip pulse is terminated, timer 50 is actuated by its termination to produce an output signal having a duration determined by the values of R73, R76 and C26 and by the duration of the slip pulse. C26 charges through R76 and the base-emitted junction of Q29 for the duration of the slip pulse. Upon termination of the slip pulse, inverter 36 (A4B) goes high at its output, thereby forcing the base of transistor Q29 above +5 volts (DC), thereby turning it off. Thus, an output signal is produced at pin 3 of A4A for as long as it takes C26 to discharge sufficiently through R73 for transistor Q29 to turn on again. Depending upon whether the output of timer 50 is connected to an input of NOR gate 26 (A6A) in the modified (M) configuration or to an input of NOR gate 38 (A6B) in the normal (N) configuration, solenoid valve S1 or S2 will be energized for the variable duration of the output of timer 50.

The power amplifiers 28 and 40 are controlled by NOR gates 26 and 28, respectively, the outputs of which are normally low with all high inputs. With any one or more inputs to A6A low, the output will go high. This high output at pin 6 of A6A will turn on transistor Q19, which then turns on transistor Q20 to switch the low terminal of solenoid valve S1 to ground. The inductive current developed by the coil of solenoid S1 is shunted to ground by zener diode D13. NOR gate 38 and power amplifier 40 have the same construction and mode of operation as NOR gate 26 and power amplifier 28.

The fail-safe circuit comprises an OR gate 68, a timer 70, and a crowbar circuit 72. C22 in the timing circuit 70 is normally prevented from charging by transistors Q24 and Q25 in OR gate 68, each of which is normally turned off to prevent the flow of charging current through either transistor and resistances R68 and R62 to C22. With solenoid S1 energized, the turn-off voltage is removed from Q24 which then becomes conductive and allows charging current to flow to C22. Similarly, if solenoid valve S2 is energized, the turn-off voltage is removed from the base of Q25 to allow the flow of charging current to C22. When the anode voltage of unijunction transistor Q23 becomes greater than the bias voltage on its gate, Q23 fires and thereby causes the SCR crowbar circuit 72 to fire, shorting the +V1 to ground and blowing the system protector fuse (not shown). The pulse-forming gate circuit comprising R69, C23, D14 and Q26 allows solenoid valve S2 to stay continually on in the normal valve connection shown as long as solenoid valve S1 cycles on and off before the voltage across C22 reaches a level at which Q23 is fired. Every positive going pulse from power amplifier 28 turns Q26 on thereby discharging C22 through the nominal resistance value of R62 during the periods of conduction of Q26.

The continuity test circuit 60 is an OR gate in which transistors Q31 and Q35 are normally conductive. A discontinuity in either left wheel speed sensor 10 or right wheel speed sensor 12 will cause Q35 or Q31, respectively, to turn off. In either event, the emitter of Q32 is no longer connected through Q31 and Q35 to ground. Consequently, the turn on current path across the emitter base junction of Q33 through R79 and the collector emitter junction of Q32 is opened, causing Q33 to turn off, thereby causing Q34 to turn off the normally high output of driver circuit 62 and thereby actuate a warning circuit 64 such as an annunciator and/or a buzzer.

Transistor Q32 is biased by the voltage appearing at pin 13 of A1C in low-voltage threshold circuit 66. If $+V_1$ drops below 7.4 volts (DC), Q32 will be turned off, thereby resulting in actuation of the annunciator and/or buzzer 64. A1C also acts to clamp $v(t)$ for approximately 135 to 240 milliseconds after power supply turn on until the inputs to A2 are stabilized, thereby preventing spurious energization of solenoid valve S1.

The timing circuit 46 consisting of Q17, R53, R54 and C21 is activated by the slip pulse inverted through NAND gate 42 (A5B), which receives its other positive input from pin 4 from NAND gate 44 (A5C) until termination of the acceleration pulse. The high output of timer 46 is inverted at the collector of Q16 in inverter 48 to hold Q15 cut off in gate 32 and thereby hold field effect transistor Q14 off until timer 46 runs out due to charging of C21 to a predetermined level, or until deactivation of the gate 32 by termination of the slip pulse or by termination of the acceleration pulse, which removes a necessary input from pin 4 of NAND gate 42 (A5B) and thereby resets timer 46 to cause inverter 48 to apply a positive input to gate 32, causing Q14 to shunt input pin 11 of A3C in velocity threshold circuit 30.

Referring to the power supply circuit shown in FIG. 4, the nominal 12 volts (DC) provided by the electrical system of the associated vehicle is applied across input diode D8, and the unregulated, unfiltered voltage at the anode D8 constitutes the $+V_1$ output. This same voltage, which may fluctuate by several volts above or below its nominal value, is applied to the cathode of isolating diode D10 having a smoothing capacitance C24 connected from its anode to ground to provide a filtered output +V. A third output of +5 volts (DC) is also generated by a regulation circuit in which transistor Q27 acts as a variable resistor controlled by the voltage across C25. When +12 volts is applied to the input terminals, C25 begins to charge through R70. As the voltage across C25 increases, Q27 becomes more conductive until zener diode D11 breaks down, taking the base of Q28 off ground by the positive voltage across R71. Thus, Q28 becomes conductive to a degree directly related to the voltage across R71. Consequently, C25 is paralleled by a variable resistance in the form of Q28, causing the voltage at the base of Q27 to decrease or increase Q28 becomes more or less conductive, respectively. The circuit component values have been chosen to produce a well-regulated +5 volts (DC) at the emitter of Q27, which is filtered and smoothed by C30.

Referring to the graphs of FIGS. 5 and 6, actuation of the foot valve normally found in a vehicle braking system causes an increasing application of brake line fluid pressure starting at time $T_0$. As braking force becomes increasingly greater, at least one wheel decelerates more rapidly and begins to slip, i.e., to fall below synchronous wheel velocity. When the $-g$ threshold is exceeded at time $T_1$, solenoid valve S1 is actuated. In a system with the normal or standard modulator valve assembly described earlier, brake line fluid pressure starts to decrease gradually at time $T_1$ as shown in FIG. 5. In a system with the modified modulator valve assembly described earlier, the rate of increase of brake line fluid pressure is decreased at time $T_1$. When the change in speed of the selected wheel from its value at time $T_1$ falls below the variable reference increment of wheel speed $\Delta v$ at time $T_2$, solenoid valve S2 is actuated. In both the normal and modified systems, brake line fluid pressure is sharply reduced starting at time $T_2$. When the change in speed of the selected wheel from its value at time $T_1$ rises above the variable reference increment of wheel speed $\Delta v$ at time $T_3$, solenoid vale S1 is de-actuated and solenoid valve S2 remains actuated until time $T_4$, a variable period of time non-linearly related to the time period from $T_2$ to $T_3$ in the aforementioned normal system. In the modified system, solenoid valve S2 is de-energized at time $T_3$ and S1 remains actuated for the aforementioned variable period of time ending at time $T_4$. With both solenoid valves de-actuated at time $T_4$, brake line fluid pressure rises sharply until time $T_5$ in both the normal and modified systems. A maximum value of brake line fluid pressure is reached at time $T_5$, thereby causing strong braking force to be applied to the vehicle wheel or wheels. The foregoing cycle may then be partially or completely repeated until either wheel velocity has been reduced to a predetermined low value (preferably about 3 mph) or the foot valve of the brake system is de-actuated.

In the preferred embodiment shown in FIGS. 2–4, the various components are as follows:

| Resistances (in ohms) | | Capacitances (in microfarads) | |
|---|---|---|---|
| R1 | - 22K | C1 | - 0.1 |
| R2 | - 10K | C2 | - 50 |
| R3 | - 120K to 300K | C3 | - 0.1 |
| R4 | - 2.2K | C4 | - 0.01 |
| R5 | - 47K | C5 | - 0.01 |
| R6 | - 5.6K | C6 | - 0.1 |
| R7 | - 61.9K to 71.5K | C7 | - .047 |
| R8 | - 150K | C8 | - 0.01 |
| R9 | - 100K | C9 | - 0.01 |
| R10 | - 470 | C10 | - 0.1 |
| R11 | - 470 | C11 | - .047 |
| R12 | - 22K | C12 | - .047 |
| R13 | - 10K | C13 | - 10 |
| R14 | - 120K to 300K | C14 | - .27 |
| R15 | - 2.2K | C15 | - 1.5 |
| R16 | - 61.9K to 71.5K | C16 | - 0.1 |
| R17 | - 47K | C17 | - 0.1 |
| R18 | - 5.6K | C18 | - 4.7 |
| R19 | - 150K | C19 | - 0.47 |
| R20 | - 100K | C20 | - 0.22 |
| R21 | - 1K | C21 | - 4.7 |
| R22 | - 20K | C22 | - 4.7 |
| R23 | - 7.87K | C23 | - 0.22 |
| R24 | - 71.5K | C24 | - 50 |
| R25 | - 343K | C36 | - .047 |
| R26 | - 90.9K | C26 | - 0.47 |
| R27 | - 43.2K | C27 | - 0.22 |
| R28 | - 5.6K | | |
| R29 | - 47K | C29 | - 4.7 |

-continued

| | | | |
|---|---|---|---|
| R30 | - 5.6K | C30 | - 500 |
| R31 | - 560K | C31 | - 0.1 |
| R32 | - 51K | C32 | - 4.7 |
| R33 | - 6.81K | C33 | - .470 to 1.0 |
| R34 | - 6.81K | C34 | - .470 to 1.0 |
| R35 | - 150K | C35 | - .470 to 1.0 |
| R36 | - 150K | | |
| R37 | - 5.6K | Diodes | |
| R38 | - 100K | | |
| R39 | - 2K to 3.9K | D1 | |
| R40 | - 2K | D2 | |
| R41 | - 12K | D3 | IN914 |
| R42 | - 5.1K | D4 | or |
| R43 | - 24K | D5 | IN4148 |
| R44 | - 33K | D6 | - FD300 |
| R45 | - 5.1K | D7 | - IN914 or IN4148 |
| R46 | - 1K | D8 | - IN4004 |
| R47 | - 22K | D9 | - IN914 or IN4148 |
| R48 | - 22K | D10 | - IN4004 |
| R49 | - 15K | D11 | - IN4731A |
| R50 | - 430K | D12 | - IN4754 |
| R51 | - 47K | D13 | - IN4754 |
| R52 | - 47K | D14 | |
| R53 | - 47K | D15 | |
| R54 | - 430K | D16 | |
| R55 | - 1.5K | D17 | IN914 |
| R56 | - 120 | D18 | or |
| R57 | - 1.5K | D19 | IN4148 |
| R58 | - 1.5K | D20 | |
| R59 | - 120 | D21 | |
| R60 | - 1.5K | | |
| R61 | - 430K | Transistors | |
| R62 | - 1.5K | | |
| R63 | - 20K | Q1 | - 2N4250 |
| R64 | - 10K | Q2 | - 2N3565 |
| R65 | - 680 | Q3 | - 2N4250 |
| R66 | - 100K | Q4 | - 2N4250 |
| R67 | - 100K | Q5 | - 2N3565 |
| R68 | - 220K | Q6 | - 2N4250 |
| R69 | - 100K | Q7 | - 2N3565 |
| R70 | - 680 | Q8 | - 2N3565 |
| R71 | - 22 | Q9 | - 2N4250 |
| | | Q10 | - 2N3565 |
| R73 | - 750K | Q11 | - 2N4250 |
| R74 | - 100K | Q12 | - 2N4250 |
| R75 | - 22K | Q13 | - 2N4250 |
| R76 | - 560K | Q14 | - 2N4220 |
| R77 | - 220K | Q15 | - 2N4250 |
| R78 | - 220K | Q16 | - 2N3565 |
| R79 | - 22K | Q17 | - 2N3565 |
| R80 | - 22K | Q18 | - 2N3565 |
| R81 | - 51K | Q19 | - 2N3567 |
| R82 | - 51K | Q20 | - 2N5294 |
| R83 | - 51K | Q21 | - 2N3567 |
| R84 | - 22K | Q22 | - 2N5294 |
| R85 | - 22K | Q23 | - 2N6027 |
| | | Q24 | - 2N4250 |
| Integrated Circuits | | Q25 | - 2N4250 |
| | | Q26 | - 2N3565 |
| A1 | - MC3302P | Q27 | - 2N5294 |
| A2 | - AD502IN | Q28 | - 2N3567 |
| A3 | - MC3302P | Q29 | - 2N4250 |
| A4 | - MC849P | Q30 | - 2N3565 |
| A5 | - MC849P | Q31 | - 2N3565 |
| A6 | - MC830P | Q32 | - 2N3565 |
| | | Q33 | - 2N4250 |
| Silicon Controlled Rectifier | | Q34 | - 2N5294 |
| | | Q35 | - 2N3565 |
| SCR1 | - C106A2 | Q36 | - 2N4250 |
| | | Q37 | - 2N4250 |
| | | Q38 | - 2N4250 |
| | | Q39 | - 2N3565 |
| | | Q40 | - 2N3565 |
| | | Q41 | - 2N3565 |

The disclosed embodiment could be reduced to more basic configurations by eliminating various component circuits. For example, the timer 50 could be omitted. Similarly, the continuity test circuit 60 and the low voltage threshold circuit 66 and their associated driver circuit 62 and warning circuit 64 could be omitted. The acceleration threshold circuit 52, with the associated timer 54, flip-flop circuit 56–58, and NAND gate 44 could all be eliminated, since they are designed to prevent latch-up of the slip loop under a particular set of circumstances, viz., an unloaded vehicle having a short wheelbase and large front brakes operating on a dry surface, under which circumstances the rate of wheel spin-up is not well-related to the surface coefficient of friction $\mu$(mu). The fail-safe circuitry comprising OR gate 68, timer 70, and crowbar circuit 72 could also be eliminated without rendering the system inoperative. The inverted slip pulse may be applied to NOR gate 38 and not to NOR gate 26. It is the applicant's intention to cover all those additions, deletions, and modifications which could be made to the embodiment of the invention herein chosen for the purposes of the disclosure without departing from the spirit and scope of the invention.

What is claimed is:
1. A signal processing circuit comprising:
   1. first circuit means operative to receive an input signal and to generate a signal representative of the first derivative of said input signal, and further operative to generate a first variable-width pulse whenever said signal representative of the first derivative of said input signal exceeds the amplitude of a first reference signal; and
   2. second circuit means operative to receive said input signal, said signal representative of the first derivative of said input signal, and said first variable-width pulse, and further operative to generate a second variable-width pulse whenever, after initiation of said first variable-width pulse, said input signal falls below the amplitude of a second reference signal which is variable in relation to both said input signal and said first derivative signal when said first derivative signal is negative, and in relation to said first derivative signal when said first derivative signal is positive.

2. The circuit according to claim 1, wherein said second reference signal is variable in a linear relationship to said first derivative signal when said first derivative signal is positive.

3. The circuit according to claim 1, wherein said second reference signal is variable in a non-linear relationship to said first derivative signal when said first derivative signal is positive.

4. The circuit according to claim 1, further comprising third circuit means operative to receive said first derivative signal and said second variable-width pulse and to generate a third variable-width pulse whenever said first derivative signal exceeds a third reference signal and remains above a fourth reference signal, and further operative for the period of coincidence of said second and third variable-width pulses to enable said second circuit means to compare said input signal to said second reference signal.

5. The circuit according to claim 1, wherein said first circuit means comprises:
   1. differentiator means operative to generate said signal representative of the first derivative of said input signal; and
   2. first threshold circuit means operative to generate said first variable-width pulse whenever the output of said differentiator means exceeds said first reference signal.

6. The circuit according to claim 5, wherein said second circuit means comprises:
   1. second threshold circuit means having first and second input terminals operative to receive said second reference signal and said input signal, respectively, and having an output terminal and further operative to generate said second variable-width pulse whenever the net signal at said second input terminal falls below said second reference signal at said first input terminal;
   2. a capacitance connected between the source of said input signal and said second input terminal of said second threshold circuit means;
   3. clamp means operative to receive a gating signal connected from said second input terminal of said threshold circuit means to ground, said net signal at said second input terminal being zero volts with respect to ground when a gating signal is not received by said clamp means, being also zero volts at the instant of unclamping by the receipt of the said gating signal, and thereafter during the gating signal being zero volts plus or minus the change in the said input signal occurring subsequent to the instant of unclamping; and
   4. variable reference signal generator means operative to receive said input signal, said first derivative signal, and said first variable-width pulse and further operative in response thereto to provide said second reference signal to said first input terminal of said second threshold circuit means.

7. The circuit according to claim 6, wherein said clamp means is further operative to receive said second variable-width pulse as a gating signal.

8. The circuit according to claim 6, further comprising timer means activated by said second variable-width pulse to provide a gating signal to said clamp means for either a predetermined period of time or the duration of said second variable-width pulse, whichever is shorter.

9. The circuit according to claim 6, further comprising third circuit means comprising:
   1. third threshold circuit means operative to receive said first derivative signal and a third reference signal, and operative to generate said third variable-width pulse whenever said first derivative signal exceeds said third reference signal and remains above said fourth reference signal;
   2. a flip-flop circuit consisting of a first NOR gate and a first NAND gate, said first NOR gate being operative to receive said third variable-width pulse and the output of said first NAND gate, and said first NAND gate being operative to receive said second variable-width pulse and the output of said first NOR gate;
   3. a second NAND gate operative to receive said third variable-width pulse and the output of said first NOR gate;
   4. a third NAND gate operative to receive said second variable-width pulse and the output of said second NAND gate; and
   5. timer means operative to receive the output from said third NAND gate, and further operative in response to the coincidence of said second variable-width pulse and a high output from said second NAND gate at the inputs of said third NAND gate to provide a clamp signal to said gating means for a predetermined period of time or for the duration of said second variable-width pulse or for the duration of said third variable-width pulse, whichever is shortest.

10. The circuit according to claim 9, wherein said third circuit means further comprises timer means operative in response to said third variable-width pulse to generate a feedback signal to said third threshold circuit means to insure that said third variable-width pulse has a predetermined minimum duration.

11. The circuit according to claim 6, further comprising timer means operative to receive said second variable-width pulse and further operative upon termination of said second variable-width pulse to generate an extending signal.

12. The circuit according to claim 11, wherein the duration of said extending signal is non-linearly related to the duration of said second variable-width pulse.

13. The circuit according to claim 11, further comprising:

1. a first output gate operative in response to at least said first variable-width pulse to generate a first output pulse; and
2. a second output gate operative in response to at least said second variable-width pulse to generate a second output pulse.

14. The circuit according to claim 13, wherein said first output gate is further operative in response to said second variable-width pulse to generate said first output pulse.

15. The circuit according to claim 13, wherein said first output gate is further operative in response to said extending signal to generate said first output pulse.

16. The circuit according to claim 13, wherein said second output gate is further operative in response to said extending signal to generate said second output pulse.

* * * * *

UNITED STATES PATENT OFFICE
CERTIFICATE OF CORRECTION

PATENT NO. : 3,988,599
DATED : October 26, 1976
INVENTOR(S) : Joseph E. Fleagle

It is certified that error appears in the above-identified patent and that said Letters Patent are hereby corrected as shown below:

Col. 9, Line 26: "base-emitted" should read --base-emitter--

Col. 11, Line 25: "vale" should read --valve--

Col. 11, under "Capacitances": "C-36" should read --C-25--

Col. 14, Line 62 (Claim 9): "to provide a clamp signal to said gating means for a" should read --to provide a gating signal to said clamp means for a--

Signed and Sealed this

Twenty-first Day of June 1977

[SEAL]

Attest:

RUTH C. MASON
Attesting Officer

C. MARSHALL DANN
Commissioner of Patents and Trademarks